United States Patent
Hung

(10) Patent No.: US 9,927,630 B2
(45) Date of Patent: Mar. 27, 2018

(54) COLOR CALIBRATION FOR PATHOLOGY SLIDES

(71) Applicant: Konica Minolta Laboratory U.S.A., Inc., San Mateo, CA (US)

(72) Inventor: Po-Chieh Hung, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 221 days.

(21) Appl. No.: 14/930,309

(22) Filed: Nov. 2, 2015

(65) Prior Publication Data
US 2016/0127707 A1 May 5, 2016

Related U.S. Application Data

(60) Provisional application No. 62/073,838, filed on Oct. 31, 2014.

(51) Int. Cl.

| | |
|---|---|
| *H04N 9/47* | (2006.01) |
| *G06K 9/00* | (2006.01) |
| *G02B 27/48* | (2006.01) |
| *G02B 21/36* | (2006.01) |
| *G02B 21/06* | (2006.01) |
| *H04N 1/60* | (2006.01) |
| *H04N 9/67* | (2006.01) |

(52) U.S. Cl.
CPC .......... *G02B 27/48* (2013.01); *G02B 21/06* (2013.01); *G02B 21/365* (2013.01); *G06K 9/00127* (2013.01); *G06K 9/00134* (2013.01); *H04N 1/60* (2013.01); *H04N 9/67* (2013.01)

(58) Field of Classification Search
CPC ....... H04N 9/735; G02B 21/365; G02B 27/48
See application file for complete search history.

(56) References Cited

U.S. PATENT DOCUMENTS

| | | | |
|---|---|---|---|
| 5,732,150 A * | 3/1998 | Zhou .................. | G01N 1/312 250/461.2 |
| 7,304,795 B2 | 12/2007 | Yavid et al. | |
| 8,705,833 B2 * | 4/2014 | Yagi .................. | G01N 1/312 382/133 |
| 2006/0245054 A1 * | 11/2006 | Yavid .................. | G03B 21/56 359/443 |
| 2008/0074649 A1 * | 3/2008 | Levenson .............. | G01N 21/23 356/73 |

(Continued)

OTHER PUBLICATIONS

Po-Chieh Hung; "Calorimetric Calibration for Scanners and Media"; SPIE, vol. 1448, Camera and Input Scanner Systems, pp. 164-174; 1991 (11 pages).

*Primary Examiner* — Tsion B Owens
(74) *Attorney, Agent, or Firm* — Osha Liang LLP

(57) ABSTRACT

A method and system for color calibration for digital microscopy includes obtaining an image of a stained sample and obtaining a desired stain type and density information. A synthesizing spectral absorption is determined based on the desired stain type and density, and a digital image is produced from the image of the stained sample based on a spectral absorption of the desired stain type, density, and a light source. The image is then outputted to a storage medium or display. The method also includes estimating a stain type used in the image of the stained sample, and estimating a density of the stained sample.

20 Claims, 4 Drawing Sheets

(56) References Cited

U.S. PATENT DOCUMENTS

| | | | |
|---|---|---|---|
| 2008/0272312 A1* | 11/2008 | Tuschel | G01J 3/44 |
| | | | 250/459.1 |
| 2013/0044200 A1* | 2/2013 | Brill | G02B 21/365 |
| | | | 348/79 |
| 2014/0055592 A1 | 2/2014 | Wei et al. | |
| 2014/0056505 A1* | 2/2014 | Hoyt | G06T 7/90 |
| | | | 382/133 |

* cited by examiner

COLOR CALIBRATION FOR PATHOLOGY SLIDES

BACKGROUND

The International Color Consortium (ICC) desires a color calibration of a whole slide image (WSI) with a microscope for pathology applications. However, the ICC only targets a basic color appearance matching for calibration. Ultimately, a uniformly processed pathology slide image is desired. Currently, each hospital or each laboratory uses their own stain and protocol. As a result, the colors of pathology slides may have great variation, which may lead to diagnosis errors.

Conventional colorimetric calibration methods use reference color charts or "color palettes," and these methods are based on appearance color matching. Other techniques may use a color filter array and an estimation of the spectral characteristics of the color image capturing device to accommodate changes in light sources.

SUMMARY OF THE INVENTION

Figure 1:
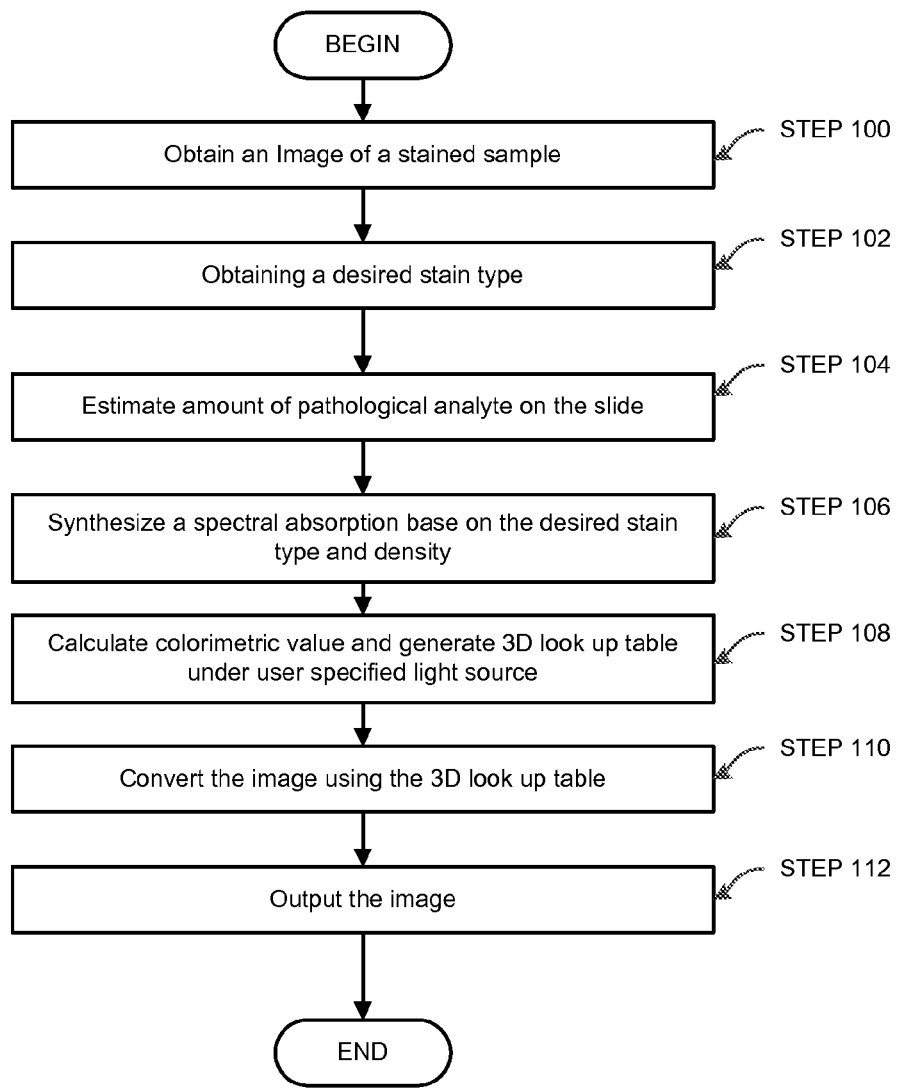
FIG. 1 shows a flowchart in accordance with one or more embodiments of the invention.

In one aspect, embodiments of the invention relate to a method for color calibration for digital microscopy. The method includes obtaining an image of a stained sample and obtaining a desired stain type and a desired density. A synthesizing spectral absorption is determined based on the desired stain type and the desired density, and a digital image is produced from the image of the stained sample based on a spectral absorption of the desired stain type, density, and a light source. The image is then outputted to a storage medium or display. The method may also include estimating a stain type used in the image of the stained sample, and estimating a density of the stained sample.

In another aspect, embodiments of the invention relate to a computer readable medium containing instructions for a processor to obtain an image of a stained sample and obtain a desired stain type. A synthesizing spectral absorption is determined based on the desired stain type and density, and a digital image is produced from the image of the stained sample based on a spectral absorption of the desired stain type, density, and light source. The image is then outputted to a storage medium or display. The method may also include estimating a stain type used in the image of the stained sample, and estimating a density of the stained sample.

In another aspect, embodiments of the invention relate to a system for color calibration for digital microscopy. The system includes a processor for obtaining an image of a stained sample and an input module for a user to select a desired stain type. A spectral absorption is synthesized based on the desired stain type and density. The processor of the system includes a digital image derived from the image of the stained sample based on the spectral absorption of the desired stain type, density, and light source. The system may also include the processor estimating a stain type used in the image of the stained sample and estimating a density of the stained sample.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for producing an image of a pathology slide as if the pathology slide had been processed at the discretion of a user. For example, pathology slides are typically obtained at fixed conditions, i.e., stain and protocol such as dipping time, solution density. Embodiments of the invention allow a user to produce an image, from a previously obtained image or measurement, where the produced image appears to have been obtained using the desired fixed pathology conditions. Embodiments of the invention provide a versatile calibration scheme for color calibration of digital microscopy for pathology slides. One or more embodiments of the invention, based on the spectral absorption of stains, may estimate the density of material and virtually synthesize colors based on stain, protocol, and light for observation that a user prefers.

Embodiments of the invention may provide for a color image preferred by a user from existing whole slide images. One or more embodiments of the invention may: adjust the variation of dying such that the type of stain is one a user desires, without color appearance matching; allow a user to choose the type of stain, or stains, and the density of such a stain, or stains; utilize one or more narrow band light sources in addition to a regular white light source; and/or provide for determining an estimated error that can be verified by comparing a broad band image and a narrow band image.

FIG. 1 shows a basic flowchart in accordance with one or more embodiments of the invention. In step 100, a stained pathological digital image is obtained. In one or more embodiments, the protocols and conditions used to obtain the image may be known. In other embodiments, the one or more stain types may be determined from the obtained image in step 102, and the amount of the pathological analyte may be determined in step 104. The details of steps 102 and 104 are described later with reference to FIG. 3.

In step 106, a spectral absorption based on the desired stain type and density is synthesized for each pixel based on a user selected stain, or stains. Then, in step 108, a colorimetric value and 3D Look Up Table (LUT) is calculated based on a user selected light source. The details of the LUT are described with regard to FIG. 3. In step 110, the obtained image is converted using the 3D LUT and interpolation resulting in a new image calibrated using the user selected stains and light source. The resulting image may then be output to a display device, or stored electronically in step 112.

Figure 2:
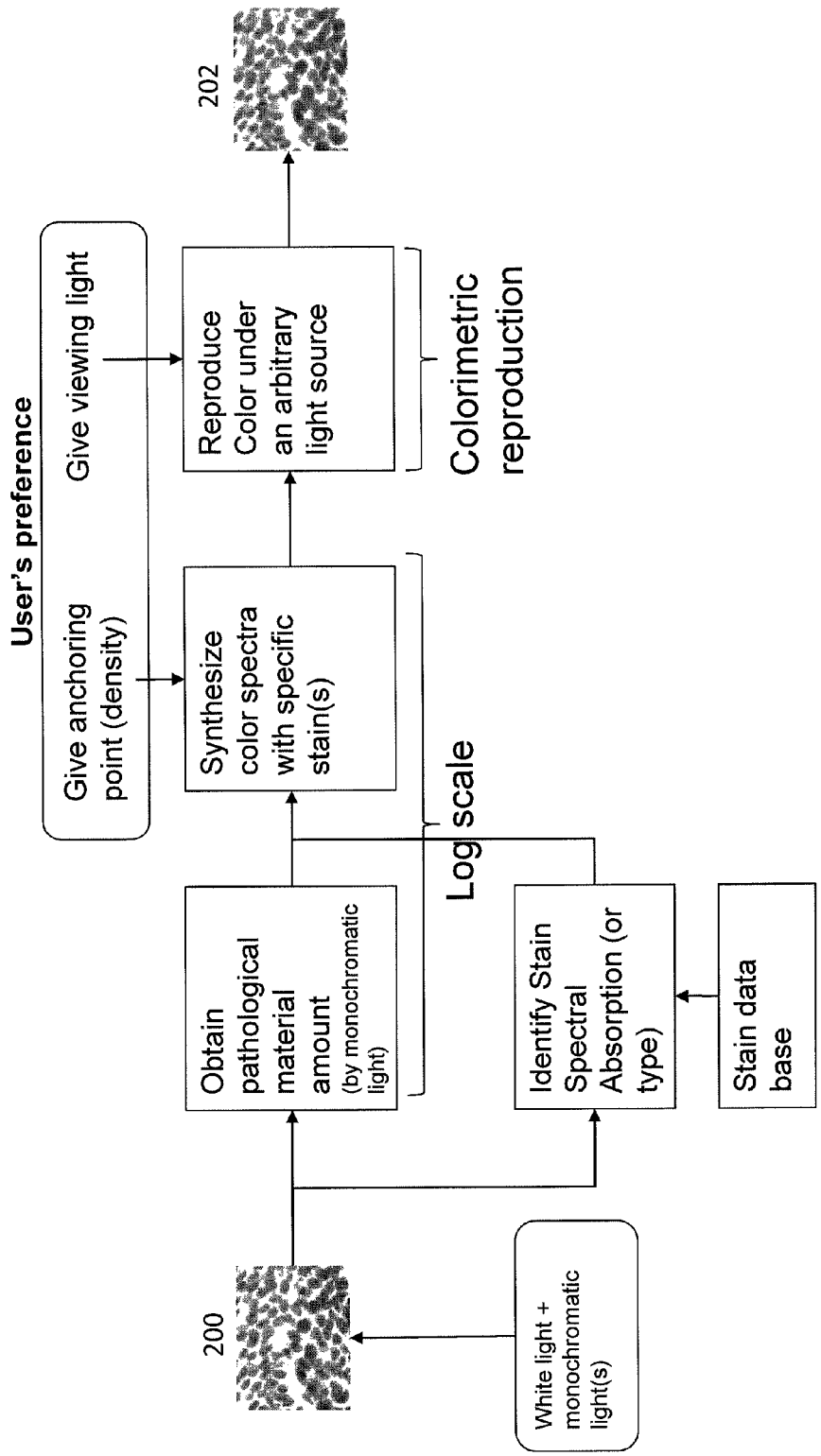
FIG. 2 shows a schematic in accordance with one or more embodiments of the invention.

FIG. 2 shows a schematic in accordance with one or more embodiments of the invention. As demonstrated in FIG. 2, a stained pathological digital image 200 is obtained. In one or more embodiments of the invention, the digital image is obtained using known stains with a white light source, or using a white light source and one or more narrow band light sources. The narrow band light sources may be provided by a laser, LED, quantum dot LED or through filtered sources in accordance with one or more embodiments of the invention. In one or more embodiments, the one or more narrow band light sources have a bandwidth of 10-20 nm. Monochromatic light sources, such as a laser, may be advantageous to use in terms of minimizing errors, but are not required. Because a laser may create speckle noise, a device to reduce the speckle noise may be used. These technologies are known, for example U.S. Pat. No. 7,304,795 B2 "Image projection with reduced speckle noise." The speckle noise may be avoided by using an incoherent light source such as LED and quantum dot LED in accordance with one or more embodiments of the invention. In addition, it may be advantageous to align the peak absorbance of one or more of the stains to the narrow band light to minimize errors, but such alignment is not required because if a peak absorption is too high, the light that passes through the stain may become weak and result in a low signal-to-noise ratio. In such case, an off-peak light source may be preferred. Multiple monochromatic light sources (both on and off peak) may be used and the light sources may be switched depending on the density of the stain In other words, in the case of a high density stain (large absorption), an off-peak light source may be used, and in the case of a low density stain (low absorption) an on-peak light source may be used in accordance with one or more embodiments of the invention.

In one or more embodiments, the narrow band light source may be used to determine the amount of the pathological analyte according to known techniques.

In one or more embodiments, as noted above, the stain, or stains, used in the obtained digital image may be known. In other embodiments, the stain or stains may be determined from the obtained image. In these embodiments, a stain data base describing the spectral absorption and types of different stains may be utilized. In one or more embodiments of the invention, the number of stains selected by the user is less than or equal to the number of narrow band light sources used in the obtained image. In one or more embodiments, if spectral absorption of an image by hyper-spectral imager is obtained, the types of stain may be estimated by a linear combination of a set of possible spectral absorption data or a principal component analysis.

With the pathological analyte amount and information of the stains used in the obtained image, a color spectra may be synthesized based on a user's preference of stains in accordance with one or more embodiments of the invention. From the color spectra and a given light source supplied by the user, a spectral distribution for each pixel of the image may be determined to produce the resultant desired pathological digital image 202.

Figure 3:
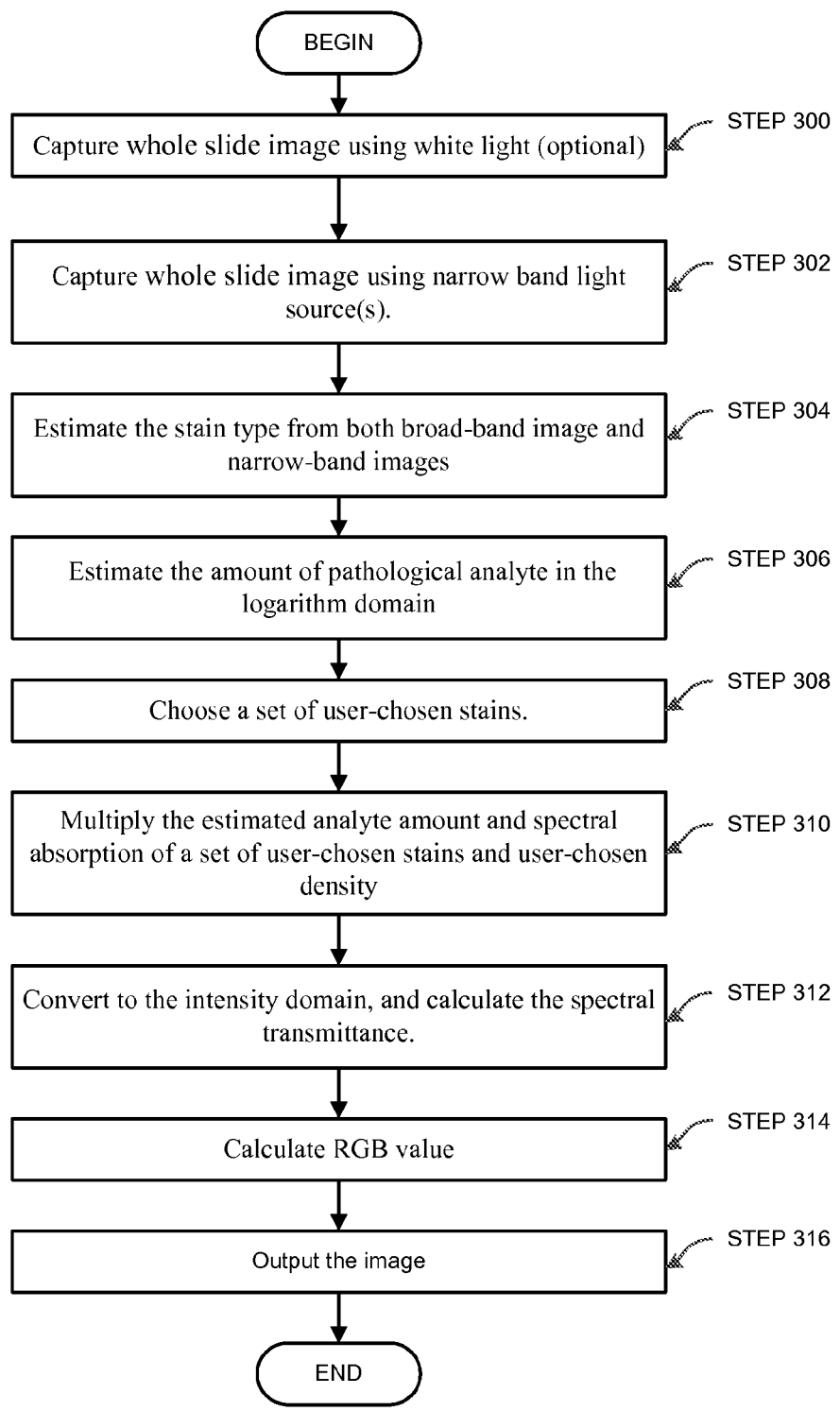
FIG. 3 shows a flowchart in accordance with one or more embodiments of the invention.

The mathematical considerations of the color calibration for digital microscopy in accordance with one or more embodiments are show in FIG. 3.

In step 300, a whole slide image, or broad band image, may be captured using a digital microscope with white light. In step 300, the $R_{x,y}$, $G_{x,y}$, $B_{x,y}$ values of the whole slide image may be determined at each (x, y) position of the obtained image. In accordance with one or more embodiments of the invention, step 300 is optional, but may be utilized as supporting information. In step 302, a whole slide image is captured using digital microscope with one or more narrow band light sources. The greater the number of narrow light sources (n), the more accurate the stains used may be distinguished on the whole slide image. If one known stain is used, one narrow band light source may be sufficient. In the calculations below, $Ch_{x,y}(\lambda_k)$ is defined as the k-th channel of image density in the logarithm domain in terms of wavelength using the narrow band light source.

In step 304, the stain type from the narrow-band image is estimated in accordance with one or more embodiments of the invention. In step 304, the broad band image, if available, may also be used to estimate the stain type. If there are n known spectral absorption data, by optimizing the following equation, the coefficient $c_i$ may be obtained as an indicator of possibility of each stain. In other words, the bigger the index, the higher the possibility of each stain. The top stain or the top two (or three) stains may be chosen for further calculation. If multiple stains were chosen, $c_i$ indicates the weight in the following equation. This estimation is performed in the logarithm domain (or axis).

$$\hat{D}s(\lambda_k) = \sum_{i=1}^{n} c_i \cdot Ds_i(\lambda_k)$$

In the above equation, $Ds_i(\lambda_k)$ is the spectral absorbance of known stains, $\hat{D}s(\lambda_k)$ is the spectral absorbance of the synthesized stain, and $\lambda_k$ is the wavelength of the k-th channel, and n is the number of known stains. For example, in the case where the two stains, Haematoxylin and Eosin, are used, n=2 and $Ds_i(\lambda_k)$ are known for each.

Based on the above, the following equation may be minimized to obtain $Ck_{x,y}(\lambda_k)$.

$$J = \min \sum_{x=1}^{Nx} \sum_{y=1}^{Ny} \left\{ \sum_{k=1}^{m} \left[ Ch_{x,y}(\lambda_k) - \varepsilon_{x,y} \cdot \hat{D}s(\lambda_k) \right]^2 \right\}$$

In the above equation, $c_i$ is the coefficient indicating the weight for mixed stains, m is the number of narrow band wavelengths, $\varepsilon_{x,y}$ is an arbitrary coefficient at the (x, y) position.

In step 306, the amount of pathological analyte is estimated in the logarithm domain. In one or more embodiments of the invention, a sum is taken for accuracy. In other embodiments, a single channel (narrow band light source) may be used.

The amount of analyte may be estimated at each (x, y) position (in arbitrary density units) by the following equation.

$$A_{x,y} = \sum_{k=1}^{m} Ch_{x,y}(\lambda_k)$$

In step 308, a set of user-chosen stains is selected by the user in accordance with one or more embodiments of the invention. The user may select one or more stains, as desired. Similar to step 304, the user desired stain type may be expressed by the following equation:

$$\hat{Ds}(\lambda) = \sum_{i=1}^{p} c_i \cdot Ds_i(\lambda)$$

where p is the number of user-chosen stains for synthesis and $\hat{Ds}(\lambda)$ is the estimated user-chosen set of stains. In these embodiments, $p \leq n$.

In step 310, the estimated analyte amount is multiplied by the spectral absorption of a set of user-chosen stains and user-chosen density, which is a constant. This is expressed by the following equation:

$$D_{x,y}(\lambda) = \alpha \cdot A_{x,y} \cdot \hat{Ds}(\lambda)$$

where $\alpha$ is the user-chosen density coefficient and $D_{x,y}(\lambda)$ is the spectral density by the estimated user-chosen stain set with user-chosen density coefficient $\alpha$. The user-chosen density coefficient $\alpha$ may be interactively determined or may be anchored by a specific portion of the image, for example the density of specific cell in the image.

In step 312, the spectral density is converted into the intensity domain, and spectral transmittance is calculated using the following equation.

$$T_{x,y}(\lambda) = 10^{-D_{x,y}(\lambda)}$$

In step 314, the spectral distribution and tri-stimulus value for each pixel may be calculated using the following equations.

$$X_{x,y} = \int L(\lambda) T_{x,y}(\lambda) \bar{x}(\lambda) d\lambda$$

$$Y_{x,y} = \int L(\lambda) T_{x,y}(\lambda) \bar{y}(\lambda) d\lambda$$

$$Z_{x,y} = \int L(\lambda) T_{x,y}(\lambda) \bar{z}(\lambda) d\lambda$$

Where $L(\lambda)$: is the spectral power distribution of the user chosen light source and $\bar{x}(\lambda)$, $\bar{y}(\lambda)$, $\bar{z}(\lambda)$, are the color matching functions.

At this stage, the tri-stimulus value using a chosen set of estimated stains may be verified from a broad-band image (camera). In other words, using conventional test color charts, matrix A may be obtained where $$\begin{bmatrix} \hat{X}_{x,y} \\ \hat{Y}_{x,y} \\ \hat{Z}_{x,y} \end{bmatrix} = \begin{bmatrix} & A & \end{bmatrix} \cdot \begin{bmatrix} R_{x,y} \\ G_{x,y} \\ B_{x,y} \end{bmatrix}$$

The matrix A may be used to estimate XYZ values from the broad-band image as described in "Colorimetric calibration for scanners and media", SPIE Proceedings Vol. 1448 Camera and Input Scanner Systems, pp. 164-174 (1991), the contents of which are hereby incorporated by reference.

If the color difference obtained using the conventional test color charts is larger than a predetermined threshold, the choice of set of stains may be changed and the process may return to step 306. The color difference can be calculated by $\Delta E^*_{ab}$, $\Delta E^*_{94}$, $\Delta E^*_{00}$ etc, as is known in the art.

If the color difference is within acceptable limits, in step 314, the RGB values may be calculated using the following equation and the set of user-chosen stains based on known techniques, for example the sRGB specification or Adobe RGB specification.

$$\begin{bmatrix} R_{sRGB} \\ G_{sRGB} \\ B_{sRGB} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \cdot \begin{bmatrix} X \\ Y \\ Z \end{bmatrix}$$

In one or more embodiments, a conversion of tone may be necessary in addition to the above matrix conversion as described in the sRGB specifications (IEC 61966-2-1).

In one or more embodiments of the invention, the series of conversions are incorporated into a 3D Look Up Table (LUT). As such, the real conversion may only need to be completed once. The LUT may be achieved using the Device Link Profile and Color Matching Module (CMM) as defined by International Color Consortium (http://www.color.org).

In step 316, the converted image data may be stored into memory, or sent it to monitor for display.

One or more embodiments of the invention may be combined with a spectrometer to estimate the stain type used in whole slide image. In one or more embodiments, if the stain type is known, steps 300 and 304 may be omitted.

In one or more embodiments, a camera with white light (i.e., broad-band image) may be used. Based on the spectral sensitivity, a large data base may be created and based on the data in the data base, the analysis may be performed. Such embodiments may be used to obtain the amount of analyte in the obtained image without an additional narrow band light source. If the spectral absorption and spectral sensitivity are known, expected outputs may be calculated for many combinations of stains. By comparing the real output with the calculated outputs, embodiments of the invention may identify the density of the stain.

It is known in the art that each stain may have a different dyeing performance depending on the analyte. In such cases, it may not be meaningful to simply change spectral density with another stain. In such cases, it may be sufficient to adjust the density to a specific protocol (density level).

Generally speaking, the computer, system 1100 includes at least the minimal processing, input, and/or output means necessary to practice embodiments of the invention.

Figure 4:
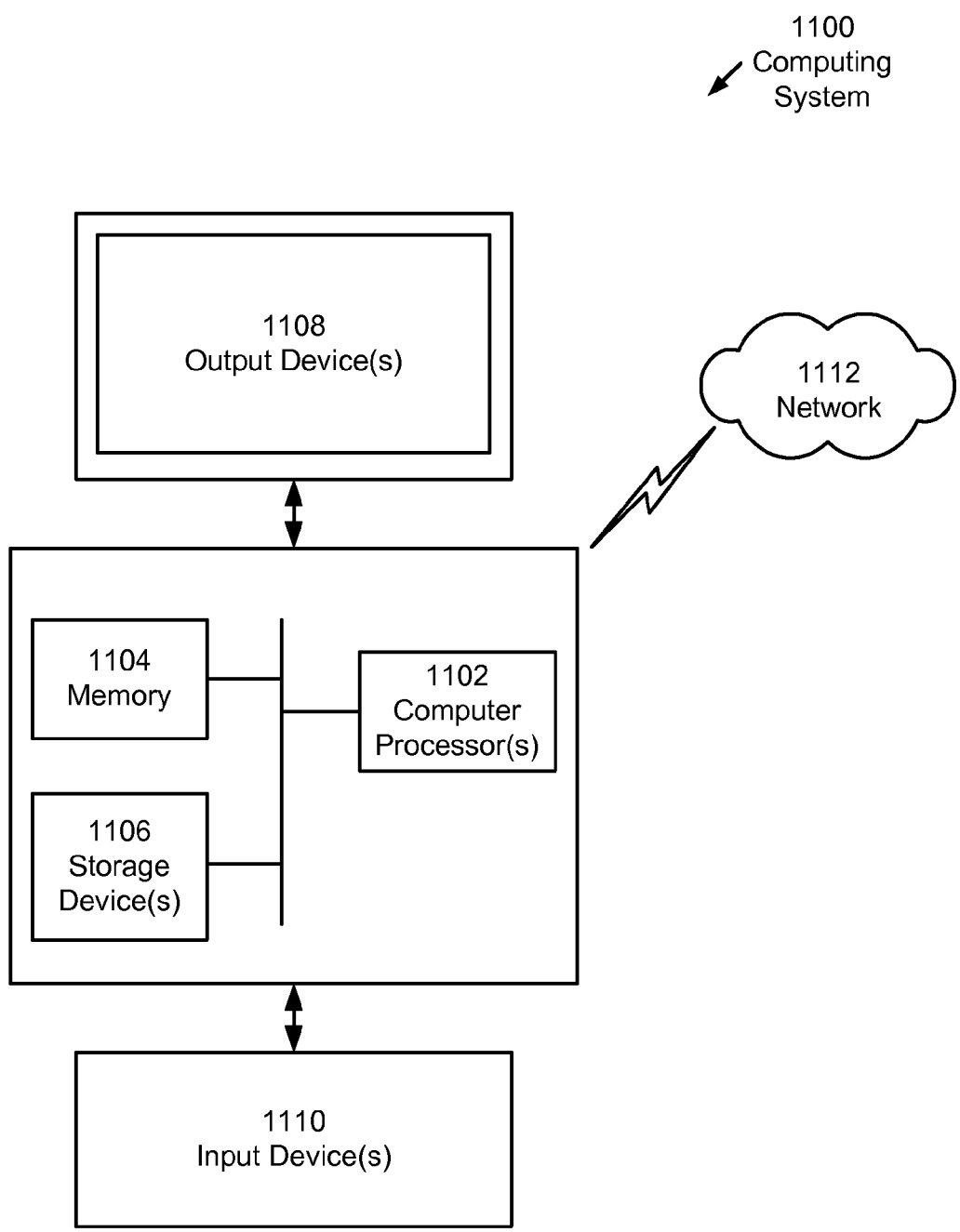
FIG. 4 shows a schematic of a computer system in accordance with one or more embodiments of the invention.

Embodiments of the invention may be implemented on virtually any type of computer regardless of the platform being used. For example, as shown in FIG. 4, a computer system 1100 includes one or more processor(s) 1102 (such as a central processing unit (CPU), integrated circuit, etc.), associated memory 1104 (e.g., random access memory (RAM), cache memory, flash memory, etc.), a storage device 1106 (e.g., a hard disk, a solid state memory drive (SSD), an optical drive such as a compact disk drive or digital video disk (DVD) drive, a flash memory stick, etc.), and numerous other elements and functionalities typical of today's computers (not shown). The computer system 1100 may also include input means 1110, such as a keyboard, a mouse, or a microphone (not shown). Further, the computer system 1100 may include output means, such as a monitor 1108 (e.g., a liquid crystal display (LCD), a plasma display, or cathode ray tube (CRT) monitor). The computer system 1100 may be connected to a network 1112 (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. For example, stain data may be stored on a server at remote location to easily maintain the update of stains. In such embodiments, the computer may send the information of WSI data to the server to identify the stain type.

Further, in one or more embodiments of the invention, one or more elements of the aforementioned computer system 1100 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device (SSD), a tape, memory, or any other non-transitory tangible computer readable storage device.

In addition, one or more embodiments of the invention may be realized in an embedded computer system. Further, one or more embodiments of the invention may be realized in an erasable programmable read only memory (EPROM), programmable logic device (PLD) or in another hardware solutions.

Embodiments of the invention may advantageously provide for synthesized color images based on stain information obtained in advance. As a result, any differences in stains may be eliminated. In addition, any variation in the dying process may be compensated for, or calibrated to a standard. Embodiments of the invention may provide a color image of pathology slides under any viewing light source desired by the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for color calibration for digital microscopy, comprising:
   obtaining an image of a stained sample, the image being previously determined under a set of first conditions;
   obtaining a desired stain type as part of a set of second conditions;
   synthesizing a spectral absorption based on the desired stain type;
   producing a digital image based on the set of second conditions from the image of the stained sample based on the spectral absorption of the desired stain type and a light source; and
   outputting the digital image,
   wherein the image of the stained sample is obtained using light sources that include one or more narrow band spectral characteristics as part of the first conditions.

2. The method of claim 1, further comprising:
   estimating a stain type of the first conditions used in the image of the stained sample; and
   estimating a density of the first conditions of the stained sample.

3. The method of claim 1, wherein at least one of the one or more narrow band light sources of the first conditions is a laser.

4. The method of claim 3, wherein the laser is combined with speckle noise reduction device.

5. The method of claim 1, wherein at least one of the one or more narrow band light sources of the first conditions is an LED.

6. The method of claim 1, wherein the digital image based on the spectral absorption of the desired stain type, density, and the light source under the second conditions is obtained using a database containing information on stains.

7. The method of claim 1, wherein the digital image under the second conditions is produced using a 3D Look Up Table (LUT).

8. A non-transitory computer readable medium storing instructions for color calibration for digital microscopy, the instructions comprising functionality for:
   obtaining an image of a stained sample, the sample being previously determined under a set of first conditions;
   obtaining a desired stain type as part of a set of second conditions;
   synthesizing a spectral absorption based on the desired stain type;
   producing a digital image based on the set of second conditions from the image of the stained sample based on the spectral absorption of the desired stain type and a light source; and
   outputting the digital image,
   wherein the image of the stained sample is obtained using light sources that include one or more narrow band spectral characteristics as part of the first conditions.

9. The non-transitory computer readable medium of claim 8, wherein the instructions further comprise functionality for:
   estimating the stain type of the first conditions used in the image of the stained sample; and
   estimating a density of the first conditions of the stained sample.

10. The non-transitory computer readable medium of claim 8, wherein at least one of the one or more narrow band light sources of the first conditions is a laser.

11. The non-transitory computer readable medium of claim 10, wherein the laser is combined with a speckle noise reduction device.

12. The non-transitory computer readable medium of claim 8, wherein the digital image based on the spectral absorption of the desired stain type, density, and the light source under the second conditions is obtained using a database containing information on stains.

13. The non-transitory computer readable medium of claim 8, wherein the digital image under the second conditions is produced using a 3D Look Up Table (LUT).

14. The non-transitory computer readable medium of claim 8, wherein at least one of the one or more narrow band light sources of the first conditions is an LED.

15. A system for color calibration for digital microscopy, comprising:
   a processor for obtaining an image of a stained sample, the image being previously determined under a set of first conditions;
   an input module for a user to select a desired stain type as part of a set of second conditions, wherein a spectral absorption is synthesized based on the desired stain type;
   wherein the processor determines a digital image based on the set of second conditions derived from the image of the stained sample based on the spectral absorption of the desired stain type and a light source, and wherein the image of the stained sample is obtained using light sources that include one or more narrow band spectral characteristics as part of the first conditions.

16. The system of claim 15, wherein the processor estimates a stain type used in the image of the stained sample and a density of the stained sample.

17. The system of claim 15, wherein at least one of the one or more narrow band light sources of the first conditions is a laser.

18. The system of claim 17, wherein the laser is combined with a speckle noise reduction device.

19. The system of claim 15, further comprising a database containing information on stains for obtaining the digital image under the second conditions based on the spectral absorption of the desired stain type, density, and the light source.

20. The system of claim 15, further comprising a 3D Look Up Table (LUT) for producing the digital image.

* * * * *